(12) United States Patent
Mori et al.

(10) Patent No.: US 7,329,152 B2
(45) Date of Patent: Feb. 12, 2008

(54) UNIVERSAL SERIAL BUS HUB AND METHOD OF MANUFACTURING SAME

(75) Inventors: Kenneth Mori, Los Angeles, CA (US); John Wadsworth, Los Angeles, CA (US); Ernesto Quinteros, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 491 days.

(21) Appl. No.: 10/649,148

(22) Filed: Aug. 26, 2003

(65) Prior Publication Data

US 2005/0094355 A1  May 5, 2005

(51) Int. Cl.
*H01R 25/00* (2006.01)
*H01R 27/02* (2006.01)
*H01R 31/00* (2006.01)
*H01R 33/92* (2006.01)
*H01R 33/94* (2006.01)

(52) U.S. Cl. ...................... 439/638; 438/928
(58) Field of Classification Search ............... 439/638, 439/639, 650, 652, 928, 490, 910
See application file for complete search history.

(56) References Cited

U.S. PATENT DOCUMENTS

| 3,990,763 | A | 11/1976 | Kress |
| 4,119,359 | A | 10/1978 | Schultz |
| 4,401,351 | A | 8/1983 | Record |
| 4,501,460 | A | 2/1985 | Sisler |
| 4,558,914 | A | 12/1985 | Prager et al. |
| 4,688,864 | A | 8/1987 | Sorel |
| D301,713 | S | 6/1989 | Bolan et al. |
| 4,845,589 | A | 7/1989 | Weidler et al. |
| 4,850,485 | A | 7/1989 | Ishikawa |
| 5,030,128 | A | 7/1991 | Herron et al. |
| 5,247,406 | A | 9/1993 | Apple et al. |
| 5,333,097 | A | 7/1994 | Christensen et al. |

(Continued)

FOREIGN PATENT DOCUMENTS

GB  2350032  11/2000

(Continued)

OTHER PUBLICATIONS

Internet: Belkin Catalog; USB 4-Port Hub; Aug. 25, 2003; [http://catalog.belkin.com/IWCatProductPage.process?Merchant_Id=1&Product_Id=20906].

(Continued)

*Primary Examiner*—Javaid H. Nasri
(74) *Attorney, Agent, or Firm*—Bryan Cave LLP (57) ABSTRACT

A universal serial bus hub (100, 900) includes a housing (110), a power port (210), a first universal serial bus port (120), and a second universal serial bus port (220). The housing includes a middle portion (112), a top portion (111) coupled to the middle portion, and a bottom portion (113) coupled to the middle portion opposite the top portion. The middle portion has a first region (163), a second region (161) substantially opposite the first region, and a third region (162), where the third region is between the first region and the second region. The power port is located at the first region, the first universal serial bus port is located at the second region, and the second universal serial bus port is located at the third region.

17 Claims, 10 Drawing Sheets

U.S. PATENT DOCUMENTS

| | | |
|---|---|---|
| 5,336,102 A | 8/1994 | Cairns et al. |
| D350,944 S | 9/1994 | Shewmon et al. |
| 5,358,420 A | 10/1994 | Cairns et al. |
| 5,381,315 A | 1/1995 | Hamaguchi et al. |
| D355,416 S | 2/1995 | McCay et al. |
| 5,440,181 A | 8/1995 | Gruender, Jr. et al. |
| D362,663 S | 9/1995 | Nguyen |
| D365,333 S | 12/1995 | Mihalik et al. |
| D366,455 S | 1/1996 | Cheng |
| 5,483,419 A | 1/1996 | Kaczeus, Sr. et al. |
| 5,498,174 A | 3/1996 | Speer et al. |
| 5,515,239 A | 5/1996 | Kamerman et al. |
| D375,909 S | 11/1996 | Dziersk et al. |
| 5,586,002 A | 12/1996 | Notarianni |
| 5,591,048 A | 1/1997 | Hahn |
| 5,604,662 A | 2/1997 | Anderson et al. |
| 5,621,890 A | 4/1997 | Notarianni et al. |
| D379,972 S | 6/1997 | Mihalik et al. |
| 5,645,434 A * | 7/1997 | Leung .................... 439/74 |
| 5,673,172 A | 9/1997 | Hastings et al. |
| 5,692,400 A | 12/1997 | Bliven et al. |
| 5,700,159 A | 12/1997 | Albeck |
| 5,706,179 A | 1/1998 | Palatov |
| D391,944 S | 3/1998 | Han |
| D392,147 S | 3/1998 | Gervais et al. |
| 5,726,922 A | 3/1998 | Womble et al. |
| D393,451 S | 4/1998 | Faranda et al. |
| 5,737,189 A | 4/1998 | Kammersgard et al. |
| 5,772,456 A | 6/1998 | Ohishi |
| 5,777,845 A | 7/1998 | Krum et al. |
| RE35,915 E | 10/1998 | Hastings et al. |
| 5,822,184 A | 10/1998 | Rabinovitz |
| 5,825,618 A | 10/1998 | Schnoor et al. |
| 5,835,353 A | 11/1998 | Dalby |
| 5,871,368 A | 2/1999 | Erdner et al. |
| 5,875,094 A | 2/1999 | Kirkendoll |
| D408,012 S | 4/1999 | Brownlie |
| 5,896,273 A | 4/1999 | Varghese et al. |
| D411,989 S | 7/1999 | Grossman et al. |
| D412,322 S | 7/1999 | Wu |
| D412,494 S | 8/1999 | Tamaki et al. |
| 5,938,473 A | 8/1999 | Nishio et al. |
| 5,940,319 A | 8/1999 | Durlam et al. |
| D413,893 S | 9/1999 | Luzbetak et al. |
| 5,956,267 A | 9/1999 | Hurst et al. |
| D415,741 S | 10/1999 | Lee et al. |
| D416,007 S | 11/1999 | Cavello |
| D416,559 S | 11/1999 | Hoyt et al. |
| 6,018,456 A | 1/2000 | Young et al. |
| D419,978 S | 2/2000 | Mah |
| D421,962 S | 3/2000 | Varga |
| D422,267 S | 4/2000 | Richards |
| D423,010 S | 4/2000 | Wicks |
| 6,047,572 A | 4/2000 | Bliven et al. |
| 6,050,849 A | 4/2000 | Chang |
| 6,052,278 A | 4/2000 | Tanzer et al. |
| D425,866 S | 5/2000 | Nagasawa et al. |
| 6,073,188 A | 6/2000 | Fleming |
| 6,076,142 A | 6/2000 | Corrington et al. |
| 6,098,131 A | 8/2000 | Unger et al. |
| 6,108,198 A | 8/2000 | Lin |
| 6,141,221 A | 10/2000 | Tong et al. |
| 6,147,859 A | 11/2000 | Abboud |
| 6,153,443 A | 11/2000 | Durlam et al. |
| D435,558 S | 12/2000 | Tong et al. |
| D436,109 S | 1/2001 | Tong et al. |
| 6,174,737 B1 | 1/2001 | Durlam et al. |
| 6,211,090 B1 | 4/2001 | Durlam et al. |
| D444,462 S | 7/2001 | Tsuji |
| D450,686 S | 11/2001 | Beaumont et al. |
| 6,331,938 B1 | 12/2001 | Hsieh et al. |
| 6,349,036 B1 | 2/2002 | Chang et al. |
| D458,608 S | 6/2002 | Tong et al. |
| 6,430,084 B1 | 8/2002 | Rizzo et al. |
| 6,430,085 B1 | 8/2002 | Rizzo |
| D462,689 S | 9/2002 | Moran |
| D465,223 S | 11/2002 | Milan |
| 6,052,278 C1 | 5/2003 | Tanzer et al. |
| D475,996 S | 6/2003 | Skulley |
| 6,607,408 B2 * | 8/2003 | Milan .................... 439/752.5 |
| 6,609,928 B1 | 8/2003 | Le |
| 6,650,549 B1 | 11/2003 | Chiao |
| 6,669,513 B2 | 12/2003 | Huang |
| 6,716,047 B2 | 4/2004 | Milan |
| 6,720,597 B2 | 4/2004 | Janesky et al. |
| 6,722,917 B2 | 4/2004 | Huang |
| 6,824,422 B2 * | 11/2004 | Huang .................... 439/535 |
| D500,497 S | 1/2005 | Yu et al. |
| 6,905,374 B2 | 6/2005 | Milan |
| D510,091 S | 9/2005 | Mori et al. |
| D512,718 S | 12/2005 | Mori et al. |
| 6,983,341 B1 | 1/2006 | Lim et al. |
| 2002/0037668 A1 * | 3/2002 | Tseng et al. .............. 439/660 |
| 2003/0225954 A1 | 12/2003 | Wu |
| 2004/0234254 A1 | 11/2004 | Czupich et al. |
| 2005/0047099 A1 | 3/2005 | Mori et al. |
| 2005/0094355 A1 | 5/2005 | Mori et al. |
| 2005/0282417 A1 | 12/2005 | Tsao |

FOREIGN PATENT DOCUMENTS

| | | |
|---|---|---|
| JP | 2000-120968 | 4/2000 |
| JP | 2000-163168 | 6/2000 |
| JP | 2000-171141 | 6/2000 |
| JP | 2000-231969 | 8/2000 |
| JP | 2000-311168 | 11/2000 |
| JP | 2001-102136 | 4/2001 |
| JP | 2003-021041 | 1/2003 |

OTHER PUBLICATIONS

Internet: Belkin Catalog; USB 7-Port Hub; Aug. 25, 2003; [http://catalog.belkin.com/IWCatProductPage.process?Merchant_Id=1&Product_Id=121417].

Internet: Netgear; Model FS605 5-Port Fast Ethernet Switch; Aug. 25, 2003; [http://www.netgear.com/products/prod_details.asp?prodID=130&view=].

Internet: Netgear; Model FS608 8 Port 10/100 Switch; Aug. 25, 2003; [http://www.netgear.com/products/prod_details.asp?prodID=132&view=].

Internet: Netgear; Model CG814M Wireless Cable Modem Gateway; Aug. 25, 2003; [http://www.netgear.com/products/prod_details.asp?prodID=160&view=].

Internet: Netgear; Model WGR614 Cable/DSL Wireless Router 54 Mbps/2.4 GHz; Aug. 25, 2003; [http://www.netgear.com/products/prod_details.asp?prodID=174&view=].

Internet: Netgear; Model MR814 802.11b Cable/DSL Wirless Router; Aug. 25, 2003; [http://www.netgear.com/products/prod_details.asp?prodID=151&view=].

Internet: Netgear; Model WGT624 108 Mbps Wireless Firewall Router; [http://www.netgear.com/products/prod_details.asp?prodID=214&view=].

Internet: Netgear; Model WGR614 Cable/DSL Wireless Router 54 Mbps/2.4 GHz; Aug. 25, 2003; [http://www.netgear.com/products/prod_details.asp?prodID=174&view=].

Internet: Netgear Model WG602 54 Mbps Wireless Access Point; Aug. 25, 2003; [http?//www.netgear.com/products/prod_details.asp?prodID=170&view=].

Internet: Netgear Model ME101 Wireless.Ethernet Bridge; Aug. 25, 2003; [http://www.netgear.com/products/prod_details.asp?prodID=175&view=].

Internet: Netgear Model WGT624 108 Mbps Wireless Firewall Router; Aug. 25, 2003; [http://www.netgear.com/products/prod_details.asp?prodID=214&view=].

Internet: Netgear Model CG814M Wireless Cable Modem Gateway; Aug. 25, 2003; [http://www.netgear.com/products/prod_details.asp?prodID=160&view=].

Internet: Netgear Model MR814 802.11b Cable/DSL Wireless Router; Aug. 25, 2003; [http://www.netgear.com/products/prod_details.asp?prodID=151&view=].

Internet: Netgear Model DG824M Wireless ADSL Modem Gateway with 4-port 10/100 Mbps Switch; Aug. 25, 2003; [http://www.netgear.com/products/prod_details.asp?prodID=165&view=].

Internet: Netgear Model RP614 4-Port Cable/DSL Routher with 10/100 Mbps Switch; Aug. 25, 2003; [http://www.netgear.com/products/prod_details.asp?prodID=131&view=].

Internet: Netgear Model DG814 DSL Modem Internet Gateway; Aug. 25, 2003; [http://www.netgear.com/products/prod_details.asp?prodID=136&view=].

Internet: Netgear Model CM102 Broadband Cable Modem; Aug. 25, 2003; [http://www.netgear.com/products/prod_details.asp?prodID=164&view=].

Internet: Netgear Model DG824M Wireless ADSL Modem Gateway with 4-port 10/100 Mbps Switch; [http://www.netgear.com/products/prod_details.asp?prodID=165&view=].

Internet: Netgear Model DM602 ADSL Modem; Aug. 25, 2003; [http://www.netgear.com/products/prod_details.asp?prodID=171&view=].

Kensington USB 2.0 Dome Hub Feb. 3, 2006 33118 www.target.com.

China (Mainland) USB Hub 2.0 Feb. 3, 2006 JCE-364 222.alibaba.com.

Value USB 2.0 Dome Hub 4 Port Feb. 3, 2006 www.mercateo.com.

* cited by examiner

UNIVERSAL SERIAL BUS HUB AND METHOD OF MANUFACTURING SAME

FIELD OF THE INVENTION

This invention relates generally to universal serial bus ports, and relates more particularly to hubs incorporating multiple universal serial bus ports.

BACKGROUND OF THE INVENTION

Universal serial bus technology has provided computer users with enhanced connectivity capabilities between computers and an increasingly wider range of peripheral devices. Universal serial bus hubs incorporating multiple universal serial bus ports into a single housing offer the ability to connect multiple peripheral devices to each other or to a computer via a universal serial bus connection. Some existing universal serial bus hubs are stackable. Although connecting a peripheral device using a universal serial bus hub can be as easy as simply plugging a universal serial bus cable into a universal serial bus port, existing universal serial bus hubs tend to place their ports in places that can be difficult to access. Additionally, existing universal serial bus hubs do not lend themselves to good cable management, leading instead to unsightly and inefficient cable arrangement. Accordingly, a need exists for a universal serial bus hub capable of being oriented in a direction chosen by the user. A further need exists for a universal serial bus hub configured to allow cables to exit from the universal serial bus hub in any direction, or in a single direction.

BRIEF DESCRIPTION OF THE DRAWINGS

The invention will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a universal serial bus hub includes a housing, a power port, a first universal serial bus port, and a second universal serial bus port. The housing includes a middle portion, a top portion coupled to the middle portion, and a bottom portion coupled to the middle portion opposite the top portion. The middle portion has a first region, a second region substantially opposite the first region, and a third region, where the third region is between the first region and the second region. The power port is located at the first region, the first universal serial bus port is located at the second region, and the second universal serial bus port is located at the third region.

Figure 1:
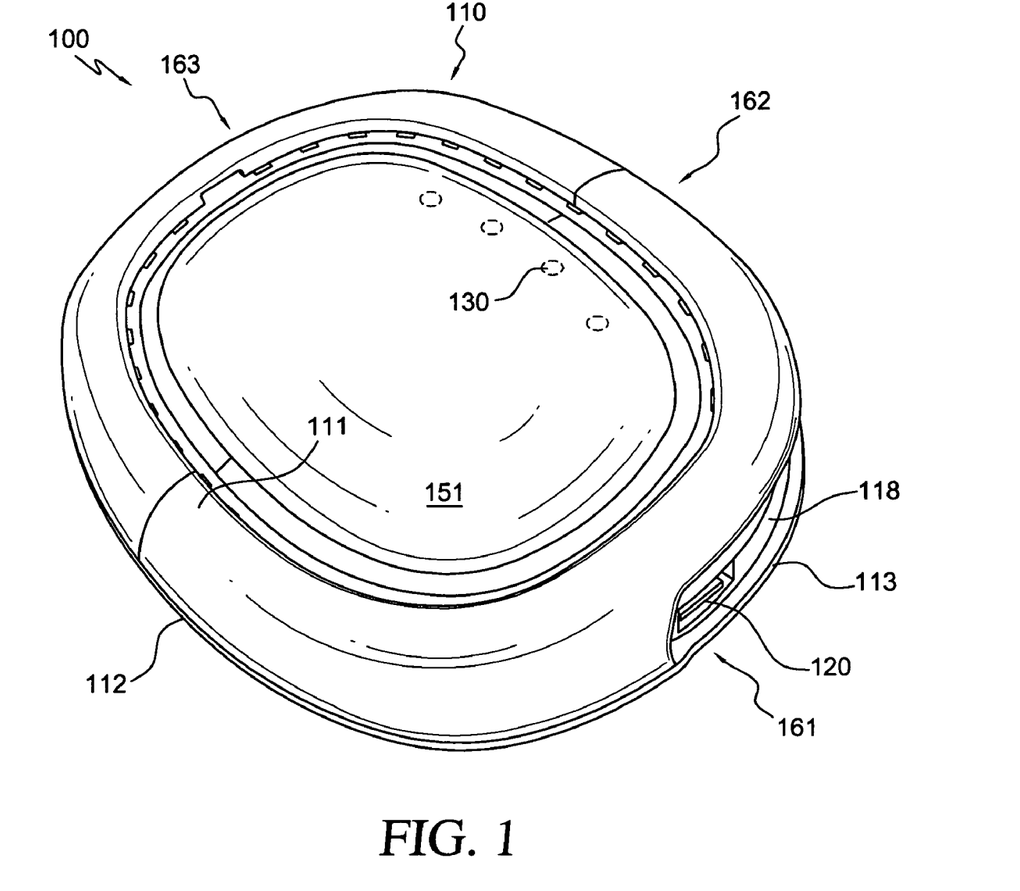
FIG. 1 is a perspective view of a universal serial bus hub according to an embodiment of the invention.
Figure 2:
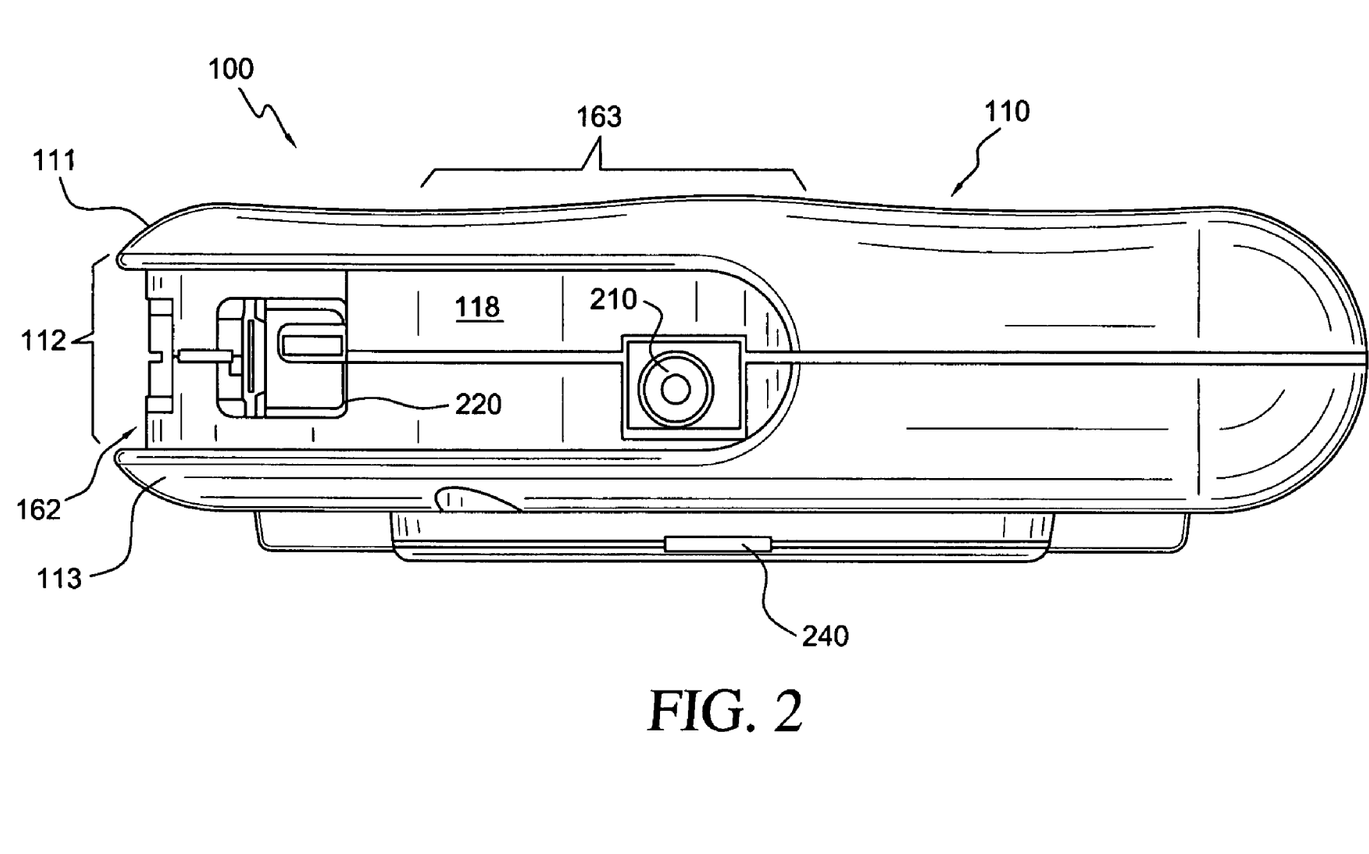
FIG. 2 is a side view of the universal serial bus hub according to an embodiment of the invention.

FIG. 1 is a perspective view of a universal serial bus hub 100 according to an embodiment of the invention. FIG. 2 is a side view of universal serial bus hub 100 according to an embodiment of the invention. Referring to FIGS. 1 and 2, universal serial bus hub 100 comprises a housing 110, a power port 210, a universal serial bus port 120, a universal serial bus port 220, and a foot 240. Housing 110 comprises a middle portion 112, a top portion 111 coupled to middle portion 111, and a bottom portion 113 coupled to middle portion 112 and opposite top portion 111. In one embodiment, at least a portion of housing 110 is coated with a rubberized material. Top portion 111 comprises a portion 151. Middle portion 112 comprises a region 161, a region 162, a region 163, and a recess 118. In one embodiment, regions 161, 162, and 163 are in recess 118. Power port 210 is at region 163, universal serial bus port 120 is at region 161, and universal serial bus port 220 is at region 162.

In one embodiment, universal serial bus port 120 comprises an upstream universal serial bus port, meaning universal serial bus port 120 is configured to receive one end of a universal serial bus cable whose other end is attached to a computer. As an example, universal serial bus port 120 can be a mini B universal serial bus port. In the same or another embodiment, universal serial bus port 220 is one of a group of downstream universal serial bus ports. In one embodiment, the group of downstream universal serial bus ports consists of four downstream universal serial bus ports.

Universal serial bus 100 can be oriented in any configuration with respect to the computer to which it is attached. Furthermore, each of universal serial bus port 120 and power port 210 can be used with cables having right angle plugs. Accordingly, each of the cables attached to universal serial bus hub 100 can be guided away from universal serial bus hub 100 in a single direction, if desired, thus increasing aesthetic value of the work space as well as increasing efficiency in terms of the amount of work space used.

As an example, consider a case where a user chooses to orient universal serial bus hub 100 such that region 162 faces away from the user. Right angle plugs on the cables used with universal serial bus port 120 and power port 210 can then be rotated such that the cables exit both universal serial bus port 120 and power port 210 in a direction away from the user, as would the cables coming from universal serial bus port 220. Alternatively, consider a case where a user chooses to orient universal serial bus hub 100 such that region 162 faces the user. Right angle plugs on the cables used with universal serial bus port 120 and power port 210 can then be rotated such that the cables exit both universal serial bus port 120 and power port 210 in a direction toward the user, as would the cables coming from universal serial bus port 220. In both such cases, universal serial bus hub 100 lends itself to advantageous cable management in that all of the cables exiting the universal serial bus ports and the power port of universal serial bus hub 100 can be arranged such that they are all oriented in a single direction.

In one embodiment, portion 151 of top portion 111 comprises a translucent material. In the same or another embodiment, universal serial bus hub 100 further comprises a status indicator 130 at top portion 111. Status indicator 130 indicates a status of at least one of power port 210, universal serial bus port 120, or universal serial bus port 220. As an example, status indicator 130 can light up to indicate that adequate power is being provided to universal serial bus hub 100, that one or more of power port 210, universal serial bus port 120, or universal serial bus port 220 are functioning properly, and/or the like. As a further example, status indicator 130 can be a light emitting diode. In one embodiment, status indicator 130 is visible through portion 151 or the translucent material. In the same or another embodiment, status indicator 130 is one of a group of status indicators. As an example, each one of the group of status indicators can indicate a status of one of the group of downstream ports.

Figure 3:
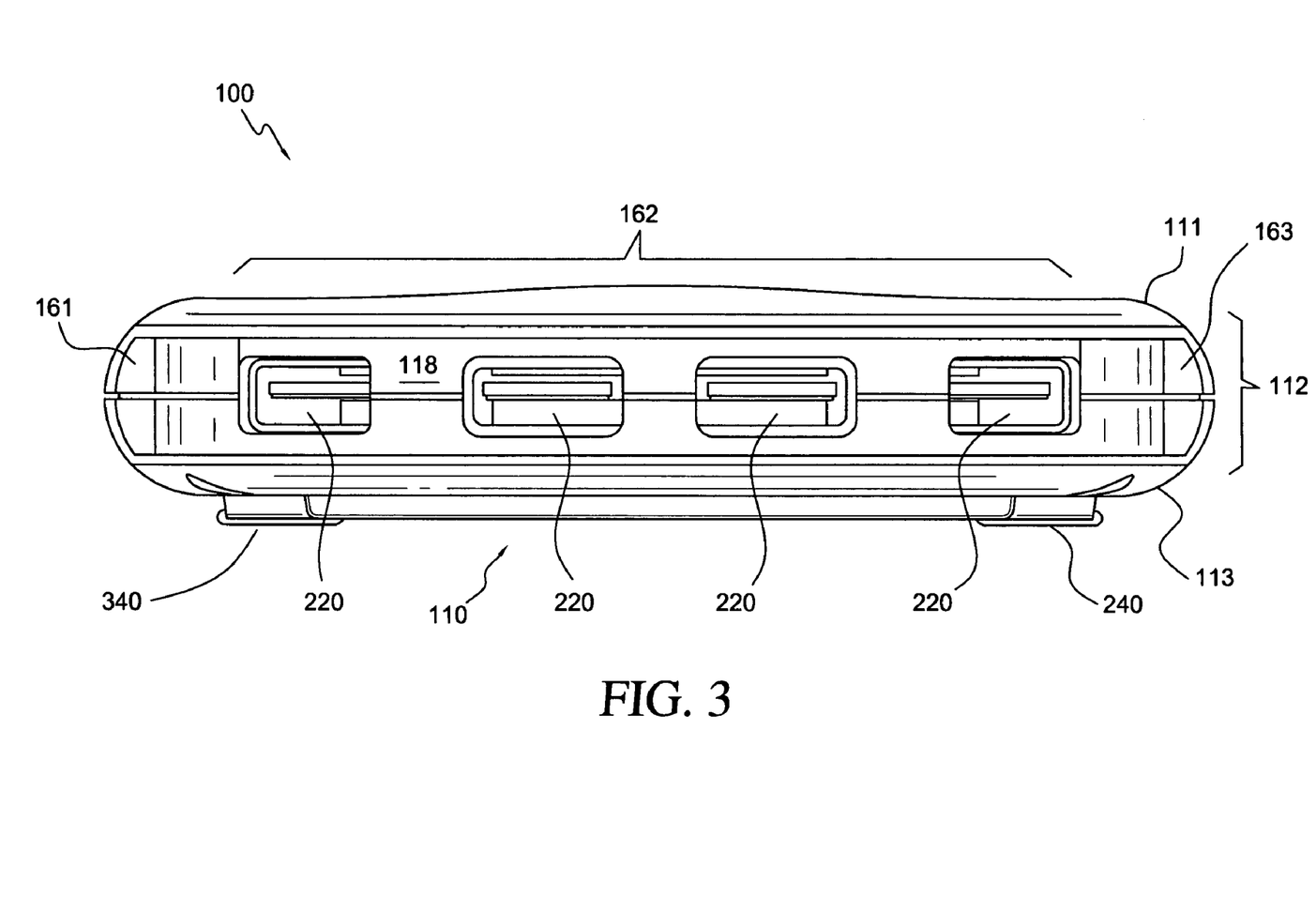
FIG. 3 is a different side view of the universal serial bus hub according to an embodiment of the invention.

FIG. 3 is a different side view of universal serial bus hub 100 according to an embodiment of the invention. As illustrated in FIG. 3, universal serial bus hub 100 comprises a foot 340 in addition to foot 240 introduced in connection with FIG. 2. Both foot 240 and foot 340 are visible in FIG. 3. Foot 240 is at bottom portion 113 and below region 163, as shown in FIG. 2. Foot 340 is at bottom portion 113 and below region 161, as shown in FIG. 3. Accordingly, foot 240 and foot 340 are at opposite ends of bottom portion 113. In one embodiment, foot 240 and foot 340 are symmetric with and/or substantially similar to each other.

Figure 4:
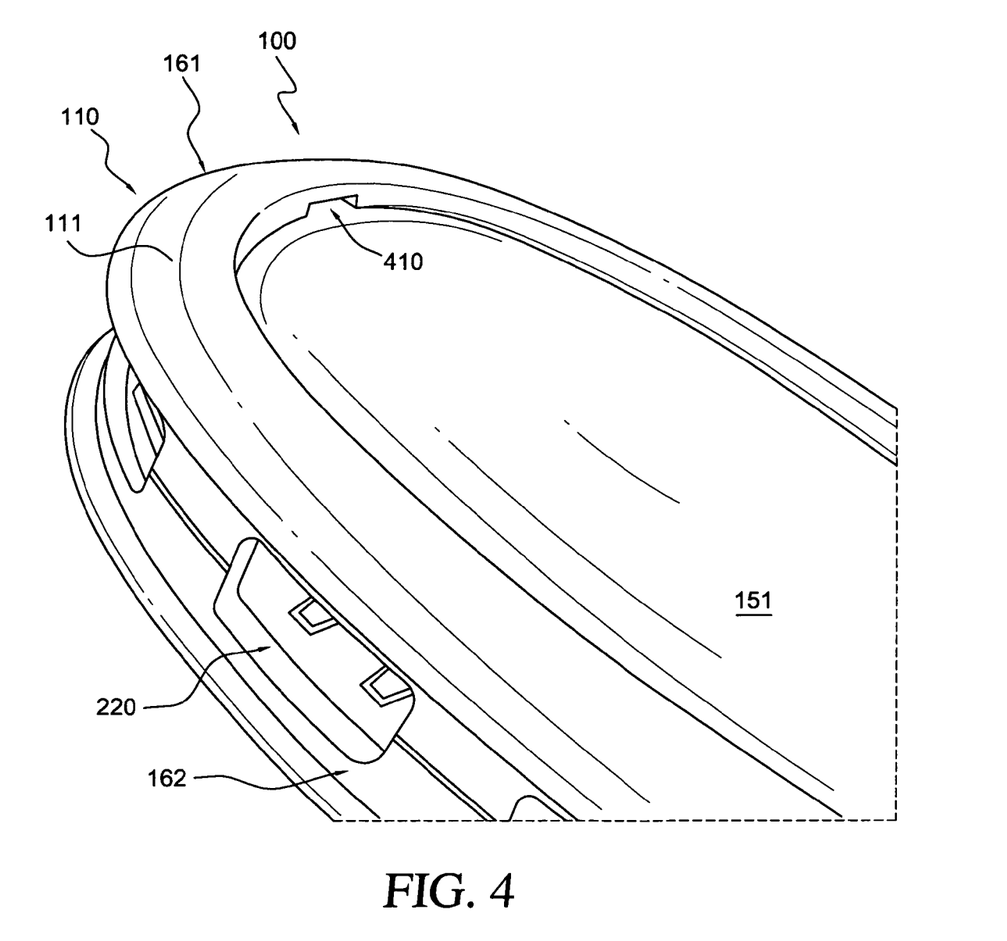
FIG. 4 is an isometric view of a portion of the universal serial bus hub according to an embodiment of the invention.
Figure 9:
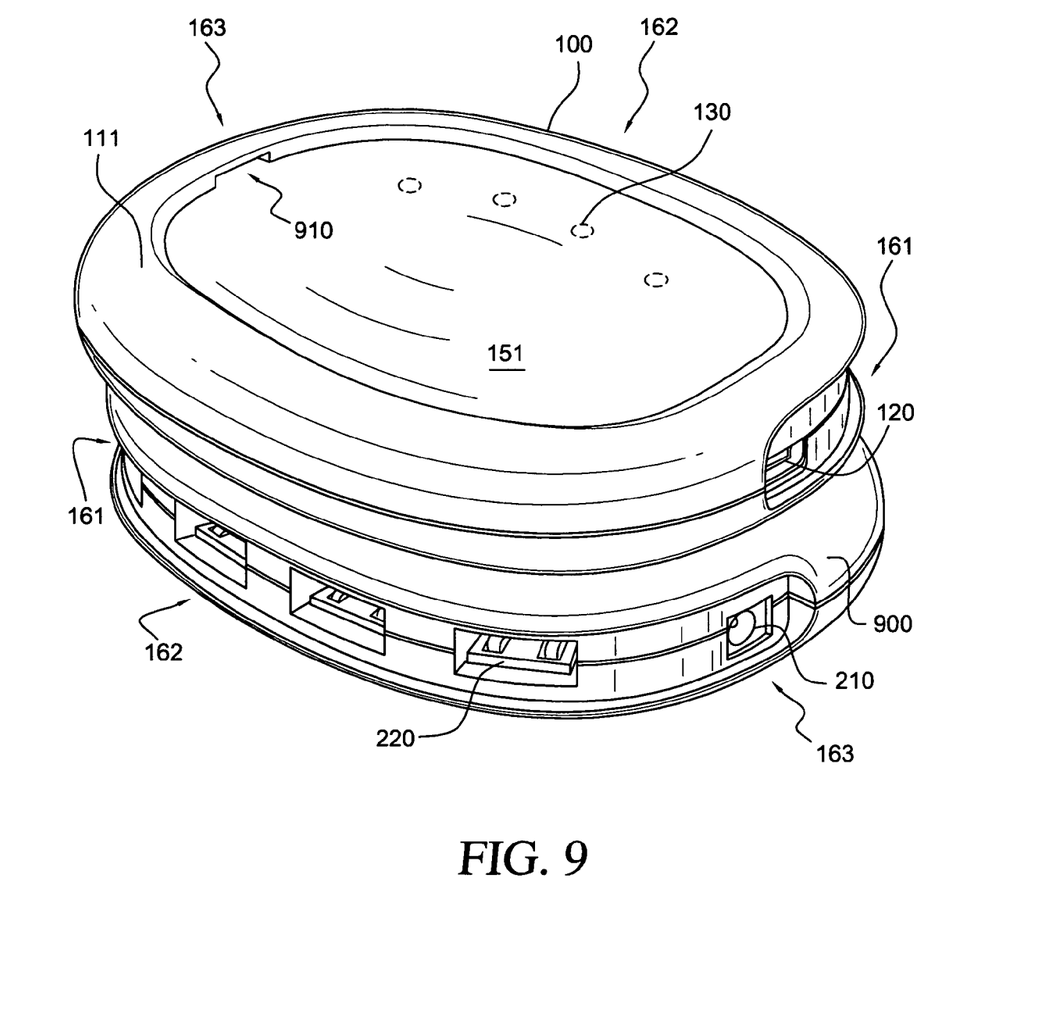
FIG. 9 is an isometric view of two universal serial bus hubs in a stacked configuration according to an embodiment of the invention.

FIG. 4 is an isometric view of universal serial bus hub 100 according to an embodiment of the invention. As illustrated in FIG. 4, universal serial bus hub 100 further comprises a slot 410 at top portion 111 and above region 161 (FIG. 1) and foot 340. Another slot is located at top portion 111 and above region 163 and foot 240, as illustrated in FIG. 9 (described below) as slot 910. Accordingly, slot 410 and slot 910 are located at opposite ends of top portion 111. In one embodiment, slots 410 and 910 are symmetric with and/or substantially similar to each other. When universal serial bus hub 100 is placed on a work surface, foot 240 and foot 340 can support housing 110 above the work surface.

Figure 5:
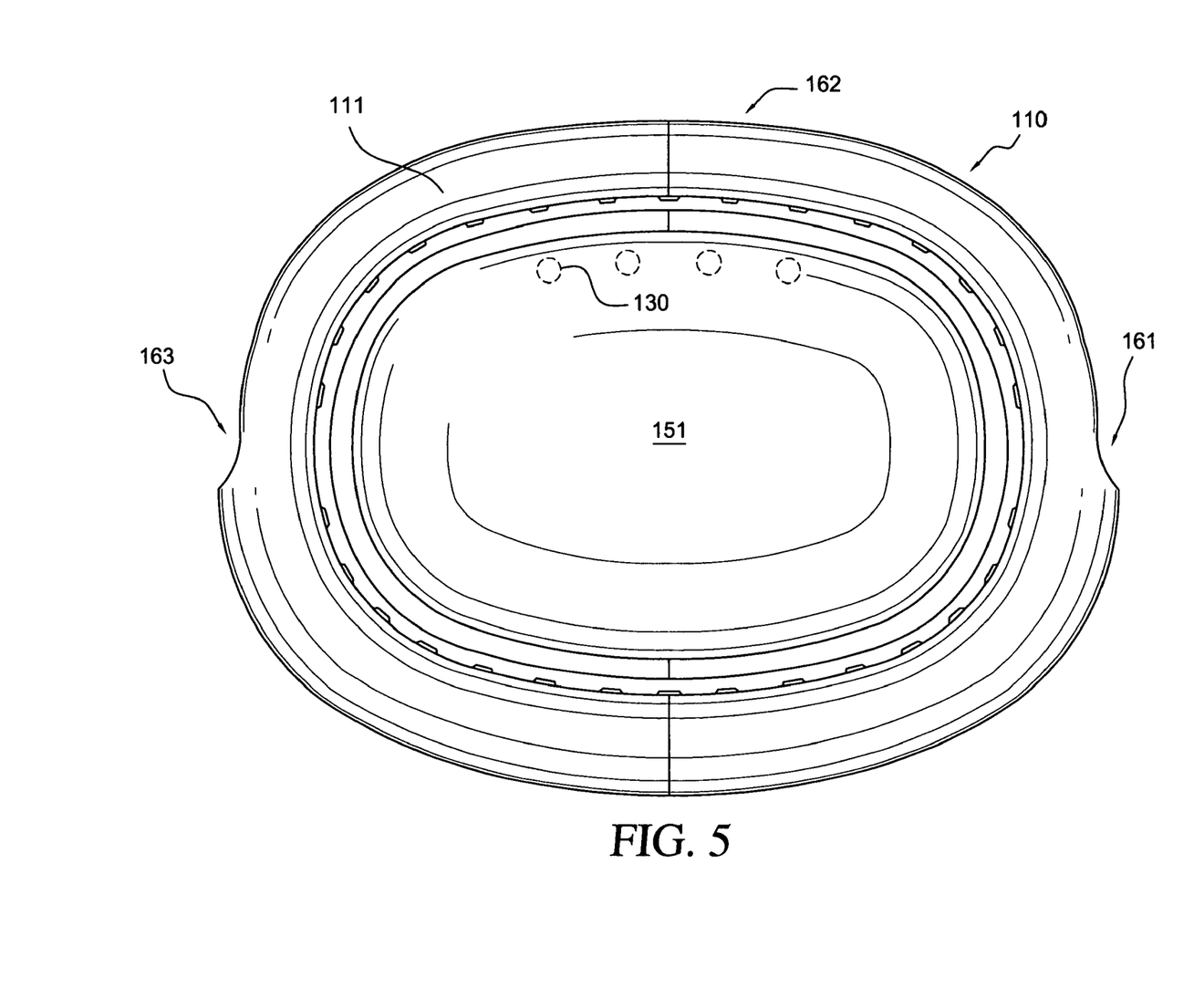
FIG. 5 is a top view of the universal serial bus hub according to an embodiment of the invention.
Figure 6:
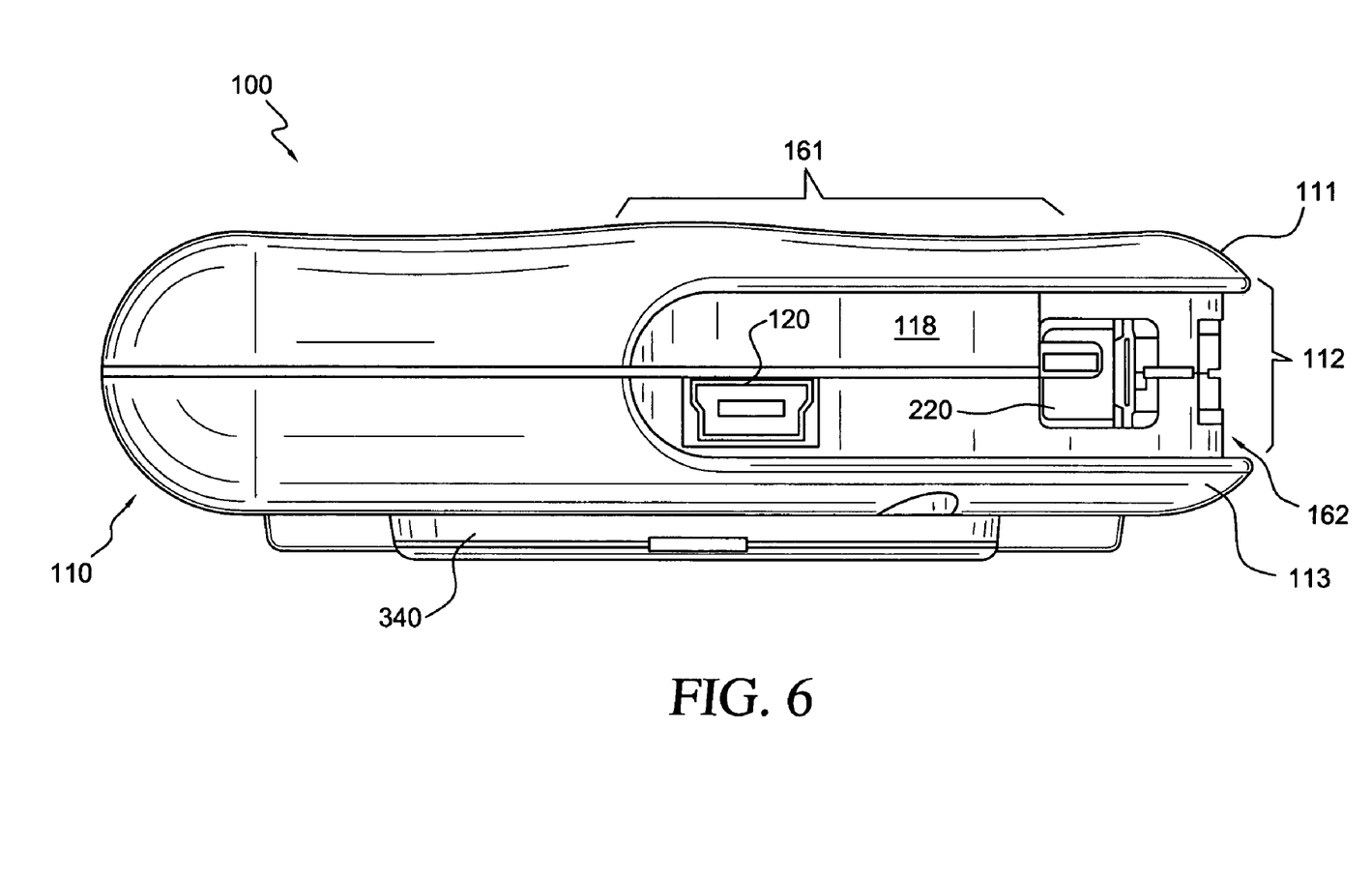
FIG. 6 is a different side view of the universal serial bus hub according to an embodiment of the invention.
Figure 7:
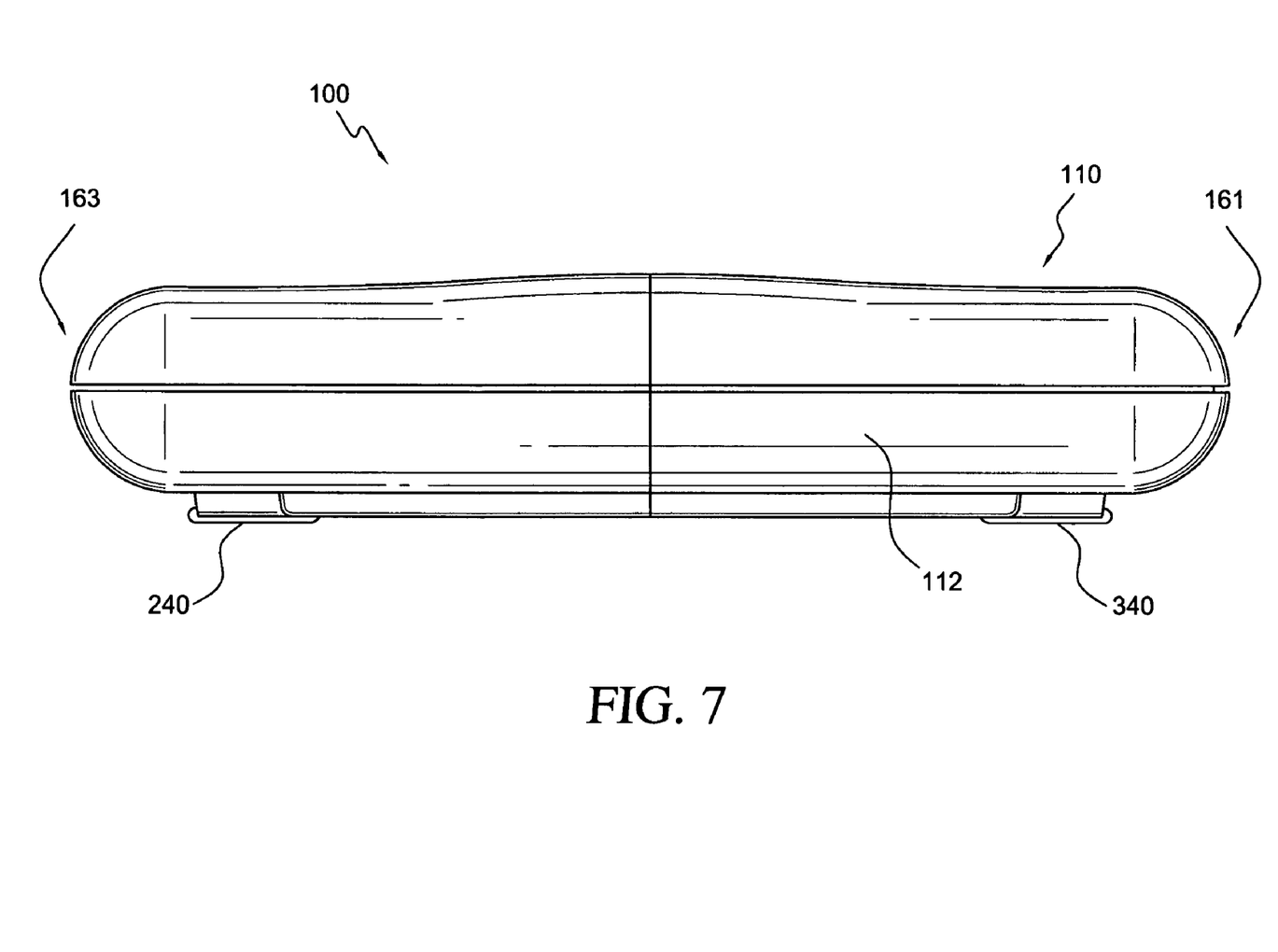
FIG. 7 is another different side view of the universal serial bus hub according to an embodiment of the invention.
Figure 8:
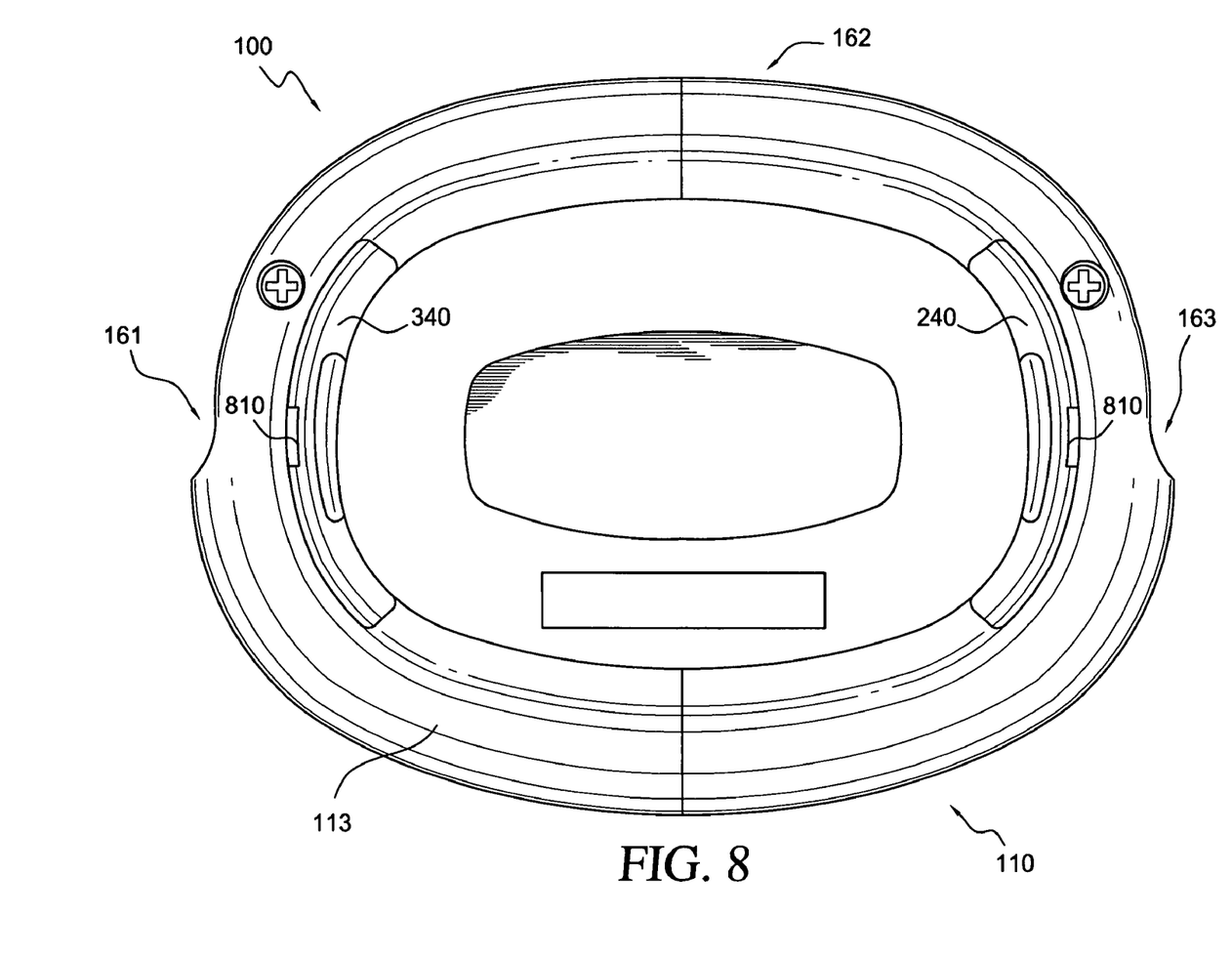
FIG. 8 is a bottom view of the universal serial bus hub according to an embodiment of the invention.

FIGS. 5-8 show universal serial bus hub 100 from additional perspectives beyond those shown in FIGS. 1-4. FIG. 5 is a top view of universal serial bus hub 100 according to an embodiment of the invention. FIG. 6 is a side view of universal serial bus hub 100 according to an embodiment of the invention. FIG. 7 is a different side view of universal serial bus hub 100 according to an embodiment of the invention. FIG. 8 is a bottom view of universal serial bus hub 100 according to an embodiment of the invention. FIGS. 6 and 7 show different sides of universal serial bus hub 100 than do FIGS. 2 and 3.

As illustrated in FIG. 8, foot 240 and foot 340 comprise tabs 810. In one embodiment, slot 410 (FIG. 4) and slot 910 (FIG. 9) are configured to receive tab 810 from one of foot 240 and foot 340. In the same or another embodiment, feet 240 and 340, including tabs 810, are flexible such that at least a portion of feet 240 and 340 flex when being inserted into or withdrawn from slots 410 and 910. It will be understood by one of ordinary skill in the art that in general, it is known to use flexible tabs on a first piece that deflect or flex to insert into slots on a second piece in order to connect the first piece to the second piece.

FIG. 9 is an isometric view of universal serial bus hub 100 stacked with a universal serial bus hub 900 according to an embodiment of the invention. Universal serial bus hub 100 is further stackable with additional universal serial bus hubs such that three or more universal serial bus hubs can be stacked on top of each other. Universal serial bus hub 900 is identical or at least substantially similar to universal serial bus hub 100, and each of the reference numerals used herein to identify elements of universal serial bus hub 100 should be understood to also refer to corresponding elements of universal serial bus hub 900. Universal serial bus hubs 100 and 900 can be oriented such that region 161 of universal serial bus 100 is above region 161 of universal serial bus 900. Alternatively, as illustrated in FIG. 9, universal serial bus hubs 100 and 900 can be oriented such that region 161 of universal serial bus 100 is above region 163 of universal serial bus 900. The ability to orient a first universal serial bus hub in a direction that is different from or the same as an orientation direction of another universal serial bus hub that is stacked with the first universal serial bus hub greatly enhances the cable management options available to the user of the universal serial bus hubs. Use of right angle plugs, as discussed above, further enhances these cable management options.

Slot 410 of universal serial bus hub 900 is configured to receive at least a portion of foot 240 of universal serial bus hub 100, and slot 910 of universal serial bus hub 900 is configured to receive at least a portion of foot 340 of universal serial bus hub 100 when universal serial bus hub 100 is stacked on top of universal serial bus hub 900, as shown in FIG. 9. Slot 410 of universal serial bus hub 900 is also configured to receive at least a portion of foot 340 of universal serial bus hub 100, and slot 910 of universal serial bus hub 900 is also configured to receive at least a portion of foot 240 of universal serial bus hub 100. Furthermore, slot 410 of universal serial bus hub 100 is configured to receive at least a portion of foot 240 and/or foot 340 of universal serial bus hub 900, and slot 910 of universal serial bus hub 900 is configured to receive at least a portion of the other one of foot 240 and/or foot 340 of universal serial bus hub 900. In one embodiment, universal serial bus hub 100 and universal serial bus hub 900 are self-aligning and/or self-interlocking when universal serial bus hubs 100 and 900 are stacked with each other.

Figure 10:
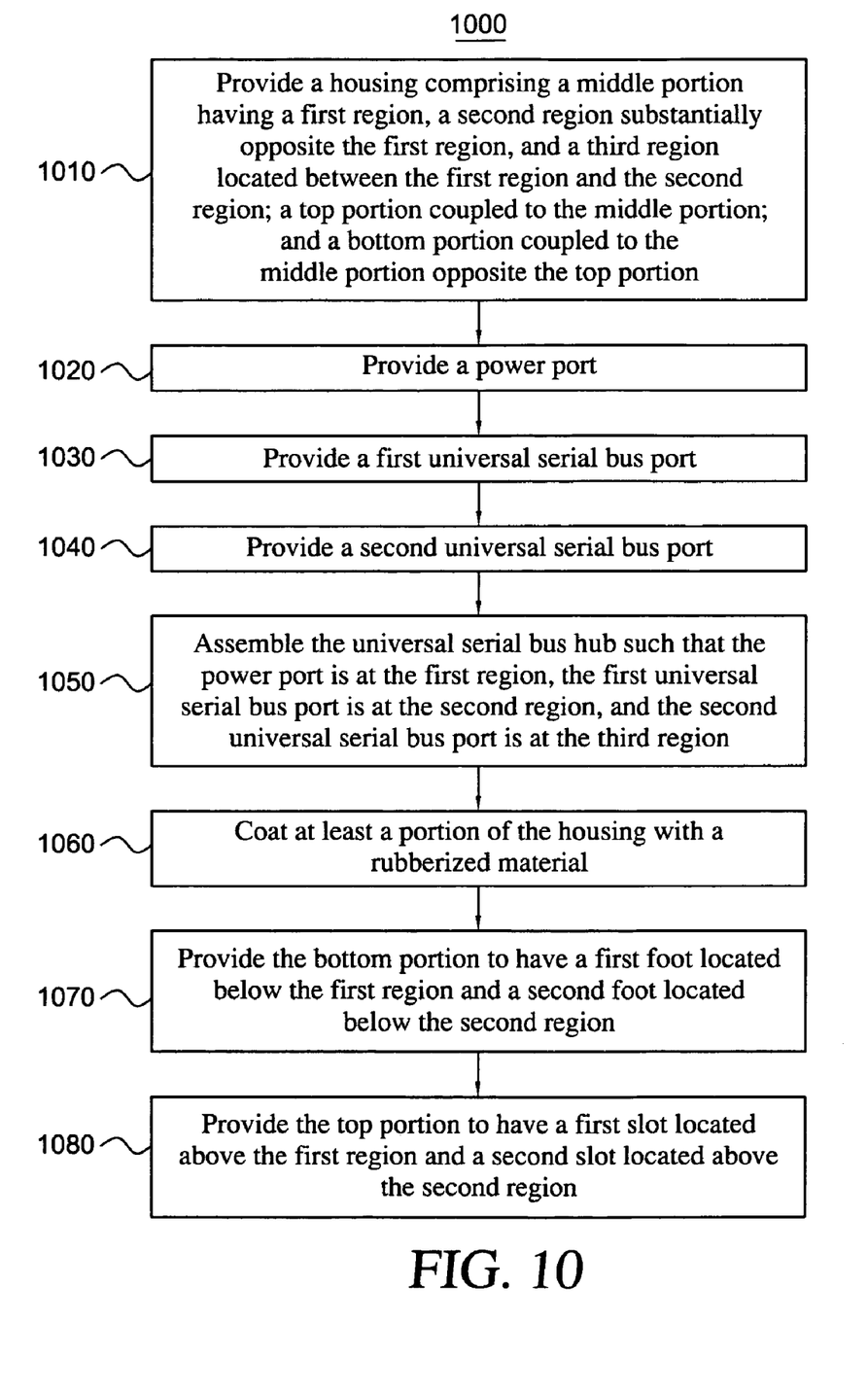
FIG. 10 is a flow chart illustrating a method of manufacturing a universal serial bus hub according to an embodiment of the invention.

FIG. 10 is a flow chart illustrating a method 1000 of manufacturing a universal serial bus hub according to an embodiment of the invention. A step 1010 of method 1000 is to provide a housing comprising a middle portion having a first region, a second region substantially opposite the first region, and a third region located between the first region and the second region; a top portion coupled to the middle portion; and a bottom portion coupled to the middle portion opposite the top portion. As an example, the housing can be similar to housing 110, first shown in FIG. 1. As another example, the middle portion can be similar to middle portion 112, first shown in FIG. 1, the top portion can be similar to top portion 111, first shown in FIG. 1, and the bottom portion can be similar to bottom portion 113, first shown in FIG. 1. As a further example, the first region can be similar to region 163, the second region can be similar to region 161, and the third region can be similar to region 162, all three of which are first shown in FIG. 1.

In one embodiment, step 1010 or another step further comprises providing at least a portion of the top portion to comprise a translucent material. As an example, the portion of the top portion can be similar to portion 151, first shown in FIG. 1. In the same or another embodiment, step 1010 or another step further comprises one or more of providing a status indicator at the top portion and providing the status indicator to be visible through the portion of the top portion. As an example, the status indicator can be similar to status indicator 130, first shown in FIG. 1.

A step 1020 of method 1000 is to provide a power port. As an example, the power port can be similar to power port 210, first shown in FIG. 2.

A step 1030 of method 1000 is to provide a first universal serial bus port. As an example, the first universal serial bus port can be similar to universal serial bus port 120, first shown in FIG. 1.

A step 1040 of method 1000 is to provide a second universal serial bus port. As an example, the second universal serial bus port can be similar to universal serial bus port 220, first shown in FIG. 2.

A step 1050 of method 1000 is to assemble the universal serial bus hub such that the power port is at the first region, the first universal serial bus port is at the second region, and the second universal serial bus port is at the third region.

A step 1060 of method 1000 is to coat at least a portion of the housing with a rubberized material. In a different embodiment, step 1060 can be performed before step 1050 and/or simultaneously with, or as a part of, step 1010.

A step 1070 of method 1000 is to provide the bottom portion to have a first foot located below the first region and a second foot located below the second region. As an example, the first foot can be similar to foot 240, first shown in FIG. 2, and the second foot can be similar to foot 340, first shown in FIG. 3. In a different embodiment, step 1070 can be performed simultaneously with, or as a part of, step 1010.

A step 1080 of method 1000 is to provide the top portion to have a first slot located above the first region and a second slot located above the second region. As an example, the first slot can be similar to slot 410, first shown in FIG. 4, and the second slot can be similar to slot 910, first shown in FIG. 9. In a different embodiment, step 1080 can be performed simultaneously with, or as a part of, step 1010.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the universal serial bus hub discussed herein may be implemented in a variety of embodiments, and that the foregoing discussion of certain of these embodiments does not necessarily represent a complete description of all possible embodiments.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A universal serial bus hub comprising: a housing comprising: a middle portion having a first region, a second region located substantially opposite the first region, and a third region located between the first region and the second region; a top portion coupled to the middle portion; and a bottom portion coupled to the middle portion and located opposite the top portion; a power port at the first region; an upstream universal serial bus port at the second region; and a group of downstream universal serial bus ports at the third region, the universal serial bus hub further comprising: a first foot and a symmetric and substantially similar second foot located at opposite ends of the bottom portion; and a recessed first slot and a recessed second slot located at opposite ends of the top portion, wherein the first slot is located above the first region and the first foot; and the second slot is located above the second region and the second foot, and wherein the universal serial bus hub is stackable with a second universal serial bus hub; the second universal serial bus hub is substantially similar to the universal serial bus hub; the first slot of the second universal serial bus hub is configured to receive inside the first slot at least a portion of the first foot of the universal serial bus hub and the second slot of the second universal serial bus hub is configured to receive inside the second slot at least a portion of the second foot of the universal serial bus hub when the universal serial bus hub is stacked on top of the second universal serial bus hub, and wherein the first foot and the second foot of the universal serial bus hub and of the second universal serial bus hub and the first slot and the second slot of the universal serial bus hub and of the second universal serial bus hub self-align and self-interlock the universal serial bus hub and the second universal serial bus hub together.

2. The universal serial bus hub of claim 1 wherein: the group of downstream universal serial bus ports consists of four downstream universal serial bus ports.

3. The universal serial bus hub of claim 1 further comprising: a group of status indicators at the top portion, wherein: the group of status indicators are visible through a portion of the top portion.

4. The universal serial bus hub of claim 3 wherein: the portion of the top portion comprises a translucent material; and the group of status indicators indicate a status of the group of downstream ports.

5. The universal serial bus hub of claim 1 wherein: at least a portion of the housing comprises a rubberized material.

6. A hub comprising multiple universal serial bus (USB) ports, the hub comprising:
   a bottom portion having at least a first foot having a first tab and a second foot having a second tab wherein the first foot and the second foot project downward and outward from at least part of the bottom portion;
   a top portion having at least a first slot and a second slot;
   wherein the hubs are stackable in a first orientation by inserting the first tab into the first slot and by inserting the second tab into the second slot; and
   wherein the hubs are stackable in a second orientation by inserting the first tab into the second slot and by inserting the second tab into the first slot.

7. The hub of claim 6 further comprising a first side having at least four USB ports and a power port wherein the hub is configured to be attachably stackable with a substantially similar hub with the first side in either the front or the back.

8. The hub of claim 6 further comprising a rubberized coating and a mini B universal serial bus port.

9. The hub of claim 6 further comprising an upstream USB port and a group of downstream USB ports.

10. The hub of claim 6 further comprising a top portion comprising a translucent cover over at least one light-emitting diode serving as a status indicator.

11. The hub of claim 6 having only two feet on opposite ends of a bottom portion of the hub and wherein the first foot and the second foot are configured to support the hub above a work surface when the hub is placed on the work surface.

12. The hub of claim 11 wherein the first slot and the second slot are symmetric with each other and substantially similar to each other.

13. The hub of claim 6 wherein the first slot and the second slot are symmetric with each other and substantially similar to each other.

14. The hub of claim 13 wherein the first tab and the second tab are configured to deflect or flex to insert into the first slot and the second slot and wherein substantially similar hubs are self-aligning and self-interlocking when stacked with each other.

15. The hub of claim 6 wherein the first tab and the second tab are configured to deflect or flex to insert into the first slot and the second slot.

16. The hub of claim 6 wherein the first foot and the second foot are symmetric, are substantially similar, and are located at opposite ends of the bottom portion.

17. The hub of claim 6 wherein the first slot and the second slot are symmetric and are substantially similar.

* * * * *